July 26, 1932.  A. A. BREUER  1,868,518
SPRAYER
Filed June 17, 1929   3 Sheets-Sheet 1
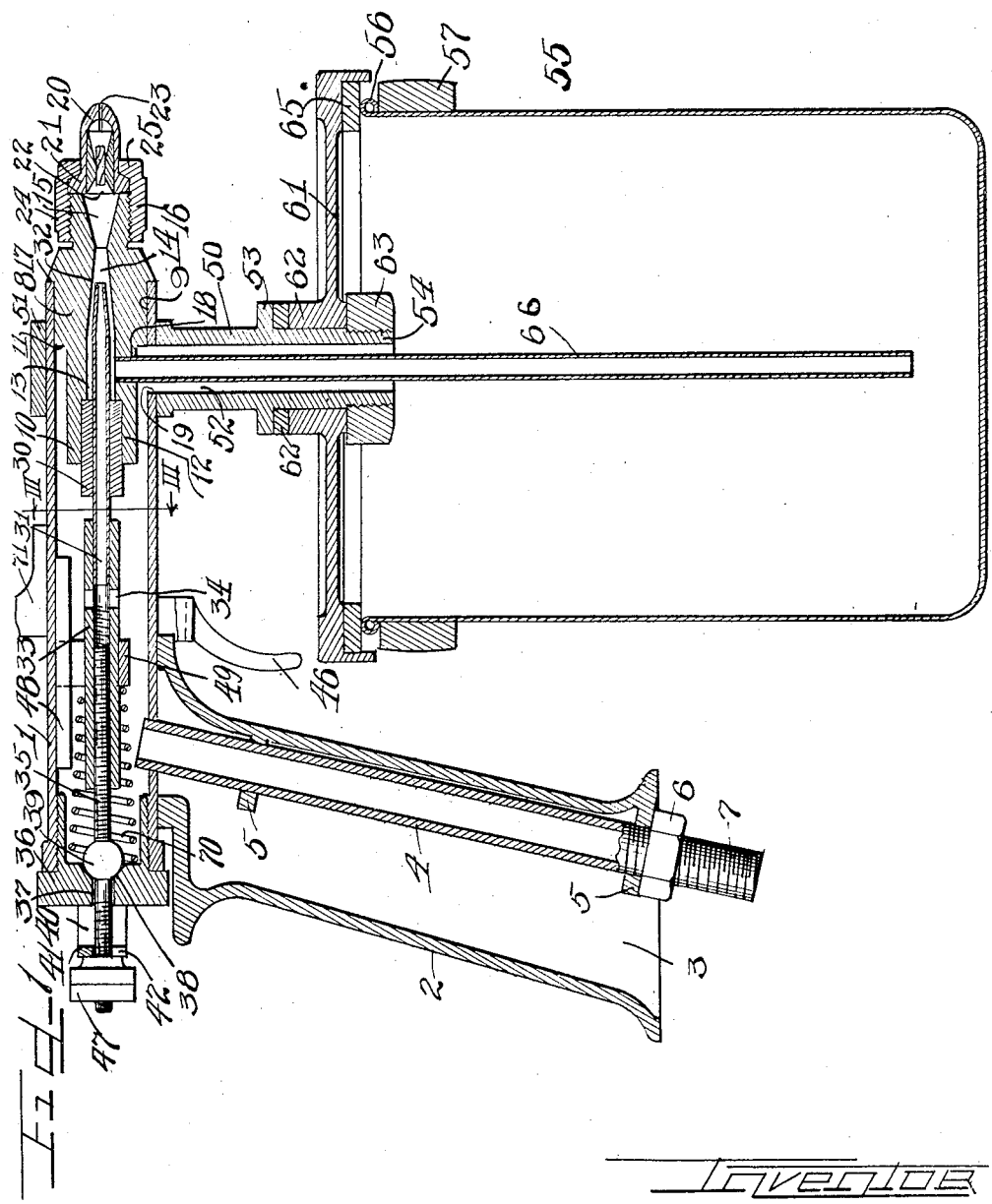

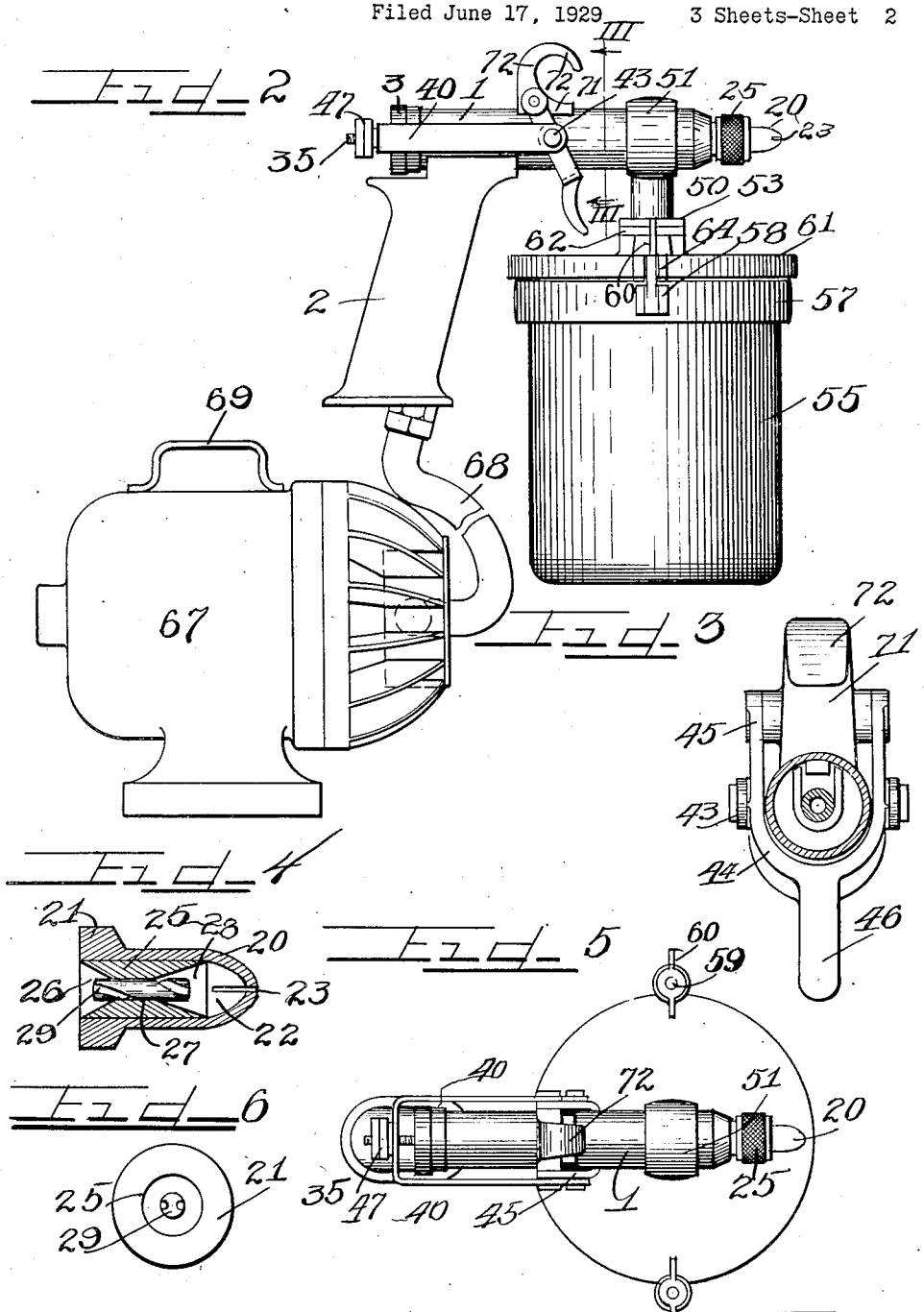

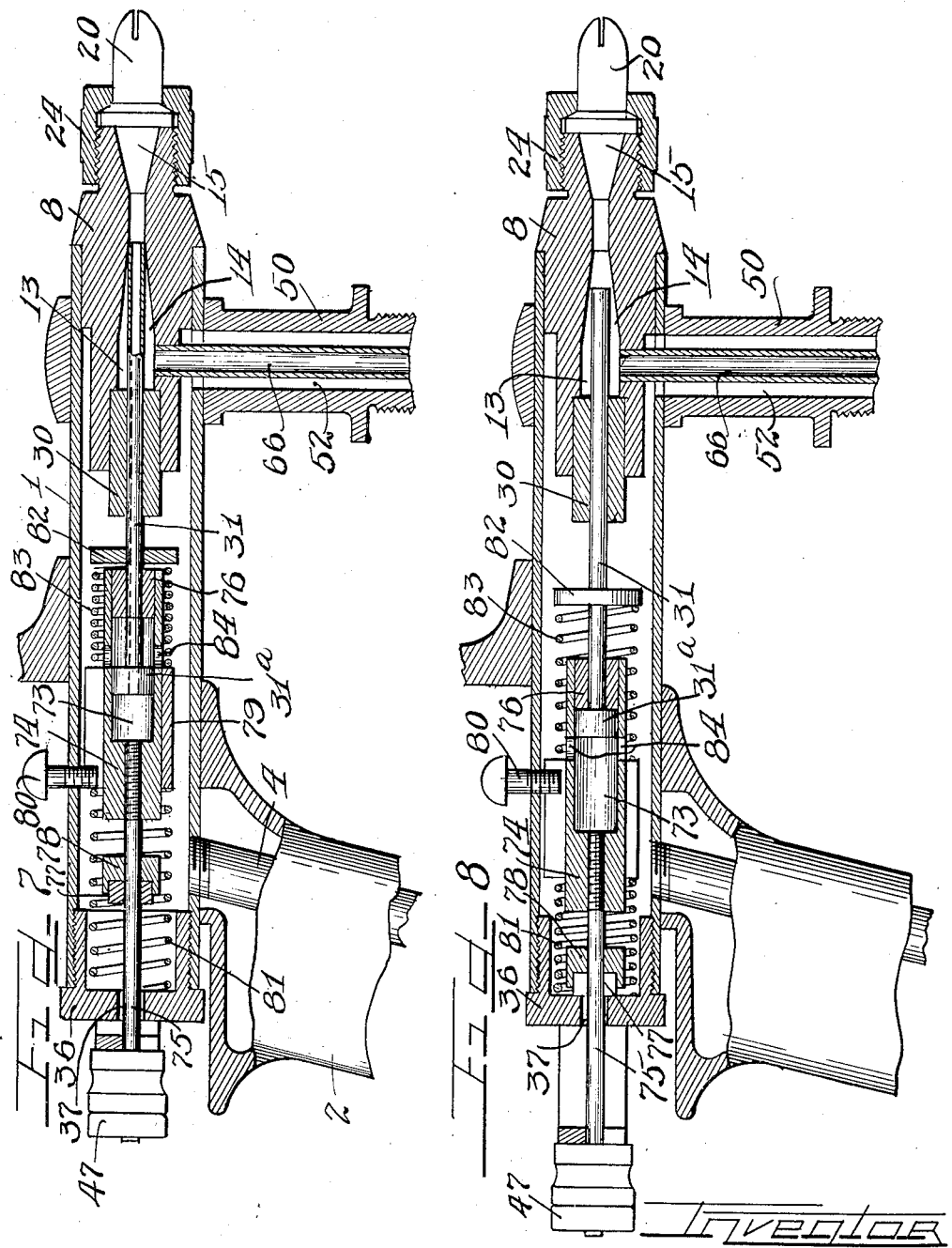

Patented July 26, 1932

1,868,518

UNITED STATES PATENT OFFICE

ADAM A. BREUER, OF CHICAGO, ILLINOIS

SPRAYER

Application filed June 17, 1929. Serial No. 371,340.

This invention relates to a sprayer, and particularly to one in which a liquid such as paint or the like is projected onto an object by an air current and in which the liquid in the form of a spray suspended in the current is discharged from the sprayer.

An object of the invention is to provide a sprayer in which the relation between the air pressure and the liquid may be varied.

Another object of the invention is to provide a sprayer in which the air pressure entering the liquid container and the pressure of the liquid issuing therefrom may be differentiated for the purpose of more finely atomizing the liquid in order that a more even coat of the same may be applied to an object.

A still further object of the invention is to provide a sprayer in which the spread of the stream issuing therefrom may be controlled as to volume and spread.

Another and still further object of the invention is to provide a sprayer with means for relieving the blower from load whenever the spraying operation is delayed for a short interval and while the blower continues in operation.

A yet further object of the invention is to provide a sprayer in which the air pressure applied to the liquid stream may be regulated for controlling the atomization of the liquid.

Another and yet further object of the invention is to provide a sprayer which is economical to manufacture, highly efficient in use and light and easy in operation.

The above, other, and further objects of the invention will be apparent from the following description, accompanying drawings, and appended claims.

According to the invention the sprayer includes a nozzle for connection to a blower which nozzle has a restricted passage into which extends an axially movable air delivery tube and with which communicates a pipe from the liquid container the parts forming an ejector, the tube being controlled by a trigger which at the same time controls a valve for allowing discharge of air into the atmosphere when the spraying operation is suspended and the blower continues in operation.

The invention further contemplates a valve controlled restricted passageway adjacent the delivery pipe from the liquid container whereby the pressure in the liquid outlet from the container may be kept below the pressure in the inlet for ready operation of the sprayer.

The invention also contemplates a removable tip which may be adjusted to the volume and spread of the stream of liquid and air issuing from the sprayer.

An embodiment of the invention is illustrated in the apparatus shown in the accompanying drawings and the views thereof are as follows:

Figure 1 is a vertical sectional central view through a sprayer with its attached container embodying the invention.

Figure 2 is a side elevational view of a sprayer embodying this invention showing it associated with a portable blower.

Figure 3 is a section taken on line III—III of Figure 1 and Figure 2.

Figure 4 is an enlarged axial section through the removable tip.

Figure 5 is a top plan view of the sprayer illustrated in Figure 2.

Figure 6 is a plan view of the tip illustrated in Figure 4 looking at the left hand end of said figure.

Figure 7 is a vertical sectional central view through a sprayer like that shown in Figure 1 with a modified form of a valve construction showing the parts when the outlet end of the nozzle is closed.

Figure 8 is a view similar to Figure 7 showing the parts with the valve or nozzle outlet open.

The drawings will now be explained.

The form of apparatus chosen to exemplify the invention includes a nozzle 1 formed of tubing. A handle 2 which may be cast of metal and having a hollow interior 3 is fastened to the rear end of the nozzle 1 in any suitable manner.

An air delivery pipe 4 is supported within the hollow 3 of the handle 2 by lugs 5 which are cast integrally with the handle and retained in adjusted position by means of a nut 6 in threaded engagement with the threaded lower end 7 of the pipe. The pipe is adjusted so that its discharge end enters the nozzle 1 a slight distance inwardly of the same.

The end of the nozzle to which the handle 2 is attached is referred to herein as the rear end and the opposite end thereof as the front end.

A plug 8 is arranged in the front end of the nozzle 1 and has a portion 9 conforming to the interior shape and size of the nozzle 1 being fastened in position by any suitable means such as by solder. The plug 8 has a rearward portion 10 the outer dimensions of which are less than the inner dimensions of the nozzle 1 thereby forming an annular shoulder 11. The plug 8 is bored with bores of various shape. The inner bore 12 is cylindrical and extends a short distance inwardly of the inner end of the reduced portion 10 of the plug. An intermediate bore 13 substantially cylindrical for a portion of its length communicates with the bore 12 and at its other end with a converging bore 14 which latter bore communicates with a diverging bore 15. The outer end of the plug 8 is threaded at 16.

The plug 8 is provided with an annular shoulder 17 for abutment against the outer end of the nozzle 1 to retain the plug in proper position within the nozzle.

The nozzle 1 is provided with an opening 19 of greater size than the opening 18 in the plug 8 and in register with said opening.

A tip 20 is provided with an enlarged flange 21 at its rear end and an interior bore 22 which bore is preferably cylindrical terminating in a conical end portion immediately adjacent the discharge end of the tip. The discharge end of the tip 20 is provided with a narrow slot 23 serving as the discharge orifice of the tip.

A collar 24 having a flange 25 for engaging the flange 21 on the tip 20 is threaded onto the threaded end portion 16 of the plug 8.

A block 25 is inserted within the bore 22 of the tip. The block 25 has an entering bore 26 which is converging communicating with a cylindrical bore 27 which latter communicates with a diverging bore 28. A portion 29 of a twist drill of proper diameter is inserted in the bore 27 of the block 25 for the purpose of imparting a whirling motion to the stream issuing from the bore 15 in the plug 8 for the purpose of more intimately breaking up the liquid.

A block 30 having a central bore therethrough is secured within the bore 12 at the rear end of the plug 8 and is arranged with its inner end extending beyond the rear end of the plug. A tube 31 is arranged for axial movement through the block 30 in a manner to be more fully hereinafter described. The discharge end of the tube 31 converges as at 32 approximating the convergence of the bore 14 of the plug 8.

A sleeve 33 is fastened to the inner end of the tube 31 and is provided with lateral openings 34 immediately behind the rear end of the tube 31. The sleeve 33 is threaded inwardly from its rear end on the interior thereof for cooperating with a screw or rod 35.

The rear end of the nozzle tube 1 is closed by a plug 36 threaded into the rear end of the tube 1. The plug 36 has an axial bore 37 therethrough and a countersunk recess 38 on the inner surface of the plug communicating with the bore 37. The screw 35 extends through the bore 37 and beyond the outer surface thereof. An enlargement such as a ball 39 is arranged on the screw 35 and normally rests in a position adjacent the countersunk base 38.

A stirrup 40 has its intermediate portion 41 slotted at 42 for fitting over the extended end of the screw 35. The arms of the stirrup extend forwardly and are connected by pivots 43 to a U-shaped trigger member 44 which is pivoted at 45 on the tube 1. The trigger member 44 has a depending finger 46 serving as a trigger proper for engagement by a finger of the operator.

A nut 47 is arranged on the outer threaded end of the screw 35 for adjusting the position of the screw with respect to the stirrup member 40 for purposes to be hereinafter explained.

A block 48 is fastened to the inner surface of the tube 1 adjacent the sleeve 33. A U-shaped guide 49 is fastened to the sleeve 33 with its arms extending upwardly for engaging the block 48 to prevent rotation of the sleeve 33 as the nut 47 is turned for adjusting the parts as will be more fully hereinafter explained.

A connector 50 preferably a casting is formed with a ring-like end 51 for receiving the outer end or front end of the tube 1 where the ring is fastened in any suitable manner such as by soldering. The connector 50 has a central bore 52 formed centrally therein and extending throughout the length of the connector. A flange 53 is formed about the connector and its lower end 54 is threaded.

The liquid container 55 is made preferably from drawn metal such as aluminum and is provided with beaded upper margin 56. The container or can 55 is supported by a ring 57 engaging underneath the bead 56 of the can and is provided with extending ears 58 arranged in pairs at diametrically opposite points on said ring and between which each pair of ears is pivoted a screw 59 carrying a wing or similar nut 60.

The cover 61 for the can 55 is made as a casting and is provided with a central hub 62 which fits over the connector 50 underneath the flange 53. A washer 62 is arranged between the underside of the flange 53 and the top side of the hub 62 for forming a tight joint. The cover 61 is secured on the connector 50 by means of a nut 63 threaded on the lower end 54 of the connector. The cover 61 is provided with ears 64 for receiving the screws 59 on the ring 57 whereby the can may be securely clamped to the cover 61 by tightening the nut 60 against the ears 64 on the cover. A suitable washer 65 is placed within the cover for forming a liquid and air tight joint between the cover 61 and the can 55.

A liquid delivery tube 66 is secured in the opening 18 of the plug 8 and extends through the bore 52 of the connector 50 and downwardly terminating short of the bottom of the can 55. The tube 66 is spaced from the bore 52.

The plug is arranged within the tube 1 so that the shoulder 11 registers with the front of the aperture 19 in the tube 1 and with the bore 52 in the connector 50.

The sprayer of this invention is designed for ready portability in use and for convenient movement from place to place.

A small portable blower 67 has been provided which is operated by an electric motor and with the fan compartment connected by means of a flexible tube 68 with the air inlet tube bore within the handle 2 for delivering air under pressure to the interior of the nozzle 1. The blower 67 is provided with a handle 69 for convenience in moving the blower. The blower is small and compact and capable of creating air pressure to operate the sprayer with any kind of liquid such as paint, insecticide and the like.

The nut 47 is so adjusted on the screw 35 so that when the trigger 46 is released a spring 70 which is interposed between the inner surface of the cap 36 and the stirrup 49 tends to move the sleeve 33 and its attached tube 31 forwardly that is to the right as viewed in Figure 1 so that the converging end 32 of the tube 31 closes passageway through the converging bore 14 within the plug 8 thus stopping air passage through the plug. The degree of movement of the tube 31 in response to actuation of the trigger 46 is controlled by adjustment of the nut 47 with respect to the stirrup 40.

The parts are so arranged that when the tube is in normal position closing passageway through the bore 14 of the plug 8 the ball 39 will be spaced a slight distance from the countersunk portion 38 of the plug 36 to allow escape of air to the atmosphere should the blower 67 continue in operation after pressure on the trigger has been released by the operator to discontinue spraying.

The operation of the illustrated form of the apparatus is as follows:

The tip 20 is adjusted by means of the nut 24 so as to dispose the slot 23 in the desired position that is horizontal, vertical or diagonal depending on the manner in which the spray discharge is to be utilized.

The blower 67 is started and the sprayer is ready for use, the sprayer can 55 of course having been filled with the proper liquid.

The parts in normal position that is in the position illustrated in Figure 1 with the blower operating allows escape of the air outwardly through the plug 36 to the atmosphere thus relieving load on the blower and allowing normal operation thereof without heating or undue strain. The operator grasps the handle 2 of the apparatus and pulls back the trigger 46 whereupon the stirrup 40 connected to the trigger bearing against the nut 47 moves the screw 35 to the rear so that the ball 39 closes the air vent or escape and the sleeve 33 which is connected to the screw 35 and to the tube 31 retracts the tube from closing the bore 14 through the plug whereupon the air pressure from the blower is directed against the shoulder 11 of the plug 8 and downwardly through the bore 52 in the connector to the can 55. A small amount of air enters the aperture 34 in the sleeve 33 and passes forwardly through the tube 31 thereby serving as an ejector in combination with the air pressure against the liquid within the can 55 to draw the liquid upwardly through the pipe 66 through the bore 13 and 14 where the liquid is commingled with the air and as a result is broken up especially in the bore 15 which bore diverges into small particles of liquid suspended in the air. This mixture of liquid and air is then forced through the block 25 in the tip 20 and by reason of the piece of drill 29 is given a rotary motion thus further atomizing the liquid immediately prior to its discharge through the slot 23.

The pressure of the air in the tube 31 is sufficient to eject the stream of liquid and air and creates a spray effect.

The provision of the slot 23 forms the stream of air and liquid into a flat stream which issues in fan-like form as it escapes from the orifice thereby in the case of paint allowing application of a thin film of paint over an object whereby a better finish is secured. The tip 20 may be rotated so as to position the orifice 23 in any manner whatsoever to accommodate the issuing stream or spray to the object against which the spray is directed. When the operator discontinues spraying for the time being and does not care to stop the blower 67 he merely releases the trigger 46 whereupon the spring 70 moves the screw 35 towards the front of the nozzle 1 exposing the aperture 37 to the interior of the nozzle whereby the air pressure therein may be discharged to the atmosphere without imposing load on the blower.

Adjustment between the ball 39 and the tube 31 may be accomplished by screwing the screw into or outwardly of the sleeve 33 thereby varying the effective length of the screw and its connected tube. It is of course understood that when the liquid is a heavy liquid such as paint that there will be a greater space about the converging end 32 of the tube 31 than when the liquid is of a lighter nature.

A sprayer made in accordance with this invention is simple, very efficient in use, economical to manufacture and one which sprays liquid within the can 55 effectively no matter how the can is held with relation to the direction of discharge from the sprayer nozzle.

The member 71 to which the trigger member 44 is pivoted may be provided with a hook 72 whereby the sprayer may be suspended when not in use or may be attached to a strap about the neck of the operator for convenience in use.

The axial adjustment of the tube 31 serves to control the amount of liquid withdrawn from the can 55 through the tube 66 by reason of the air discharged through the tube 31. The pressure of the air in the can 55 tends to elevate the liquid through the tube 66 in combination with the ejector effect produced by the air issuing from the tube 31 and axial adjustment of this tube results therefore in varying the relationship between the air pressure within the can 55 and that in the plug 8.

This adjustment also regulates the amount of liquid discharged from the can 55 because of the possibility of varying the effectiveness of the air pressure in the plug 8.

The form of the invention illustrated in Figures 7 and 8 includes the nozzle tube 1 similar to the tube 1 of Figure 1, a handle 2, an air inlet duct 4, plug 8, supporting block 30, the connector 50 for the liquid container or can 55 with the can omitted, the tip 20, retaining nut 24 for the tip. The plug 8 is provided with the same openings as is the plug 8 of Figure 1, to wit, the cylindrical opening 13 the tapering opening 14 and the converging opening 15 arranged in the order described in the direction of flow of liquid and air through the plug 8.

The liquid tube 66 is secured in the plug 8 and depends into the container 55 not shown.

A sliding tube 31 is supported by the block 30 in the plug 8 and has at its inner end a piston 31a which is movable within a bore 73 of a block 74 into which is threaded the screw 75. The outer end of the bore 73 is closed by a plug 76 having an axial aperture through which the pipe 31 passes.

The rear cap 36 is provided with an axial opening 37 through which the rod 75 extends. The diameter of the rod 75 is less than the diameter of the aperture 37 to allow escape of air when the compressor motor is operating and the discharge end of the sprayer is closed.

The rod 75 is provided with a valve 77 which is illustrated in Figures 7 and 8 as consisting of a yieldable material supported in a member 78 fastened to the rod 75.

A stirrup 79 is fastened to the block 74 and has its arms extending upwardly lying on each side of a screw or other stop 80 to prevent rotation of the block 74 as the rod 75 is adjusted axially by screwing into or out of the block 74 for the purpose of adjusting the lengths of movement of the pipe 31.

A spring 81 is interposed between the inner surface of the cap member 36 and the rear end of the stirrup 79 and tends to move the stirrup and its attached block 74 to the right as viewed in the Figures 7 and 8, that is, tends to move the parts including the tube 31 into position to close the opening through the plug 8.

A collar 82 is fastened to the tube 31 between the block 74 and the block 30 and a spring 83 is arranged between the collar 82 and the stirrup 79. This spring also tends to move the parts to the right, that is, to closing position, as viewed in Figures 7 and 8.

The bore 73 of the block 74 is provided with openings 84 affording communication between the bore 73 and the interior of nozzle tube 1. These apertures 84 are so arranged that when the pipe 31 is in closing position, that is, in the position shown in Figure 7, the openings lie between the piston 31a and the plug 76 of the bore thus cutting out air passage between the interior of the nozzle tube 1 and the pipe 31 so that no air is discharged through the pipe 31 when the same is in closed position.

Movement of the block 74 to the right as viewed in Figures 7 and 8 under influence of the spring 81 is stopped by the movement of the trigger 46 to normal or inactive position and movement of the pipe 31 to the right is determined by the engagement of the free end thereof with the converging bore 14 of the plug 8.

The operation of the valve arrangement illustrated in Figures 7 and 8 is as follows:

The parts as shown in Figure 7 are in normal or closed position. The liquid container 55 is secured to the connector 50 in the manner described with respect to Figure 1 and the blower 67 started. The sprayer is now ready for use.

The operator grasps the sprayer by the handle 2 and with a finger retracts the trigger 46 which by reason of the engagement of the stirrup 40 with the head 47 on the rod 75 moves the rod to the left, that is, to the position shown in Figure 8. Such movement first of all moves the block 74 to the left until the plug 76 thereof engages the piston 31a on the tube 31. Such movement brings the apertures 84 in the bore 73 of the block 74 to the left of the piston 31a so as to admit air pressure to the pipe 31. Continued movement of the trigger moves the parts to the left until the pipe 31, that is, the free end thereof, is retracted from engagement with the tapered bore 14 of the plug 8 so that the air issuing therefrom in conjunction with the air delivered into the container 55 through the aperture 52 in the connector 50 will eject the liquid through the tip 20. This operation continuing as long as the pipe 31 is held in open position by means of engagement of the trigger 46. Such movement of the parts to open position of the discharge end of the nozzle brings the valve 77 against the aperture 37 in the cap member 36 closing the same against escape of air pressure therethrough so that all of the air delivered from the compressor 67 is utilized for ejecting liquid through the tip 20.

The moment pressure is released on the trigger 46 the springs 81 and 83 will function to move the parts to normal or closed position as shown in Figure 7 closing the passage through the plug 8 and opening the aperture 37 to the atmosphere so that continuous operation of the blower 67 will cause discharge of air to the atmosphere through this aperture. Such movement also brings the piston 31a to the rear of the apertures 84 thereby stopping communication between the interior of the nozzle 1 and the pipe 31 so that when the pipe 31 is in closed position no air can escape through the same.

It has been found that where a slight amount of air is allowed to escape through the pipe 31 when in closed position clogging of the tip 20 takes place necessitating frequent removal and cleaning.

The arrangement shown in Figures 7 and 8 obviates this objection and enables much longer use of the nozzle embodying these features than is possible where air is allowed to escape even to a slight extent when the nozzle is supposed to be in closed position, that is, closed against the escape of liquid.

The invention has been described herein more or less precisely, yet it is to be understood that changes may be made in the arrangement and proportion of parts and that equivalents may be substituted without departing from the spirit and scope of the invention.

The invention is claimed as follows:

1. A sprayer including in combination, a nozzle tube, an apertured closure member at one end of said tube, an air admission pipe communicating with said tube adjacent said closure, a bored discharge plug at the other end of said tube, a tube slidable in said bore, a member extending through the aperture in said closure and connected to said slidable tube, said member carrying a valve for closing said aperture, means cooperating with said member for normally urging it in such direction as to space said valve from said aperture and move said slidable tube to close the passageway through said plug bore, and a trigger for moving said member in a direction to move said valve against said aperture to seal the same and to move said slidable tube away from closing engagement with said plug bore.

2. A sprayer including in combination, a nozzle tube, a plug in one end of said tube, a liquid container supported by said tube near said plug, said plug having a bore therein extending from end to end thereof and having a portion of restricted size, a tube slidable in said plug towards and away from said portion of restricted size, a liquid supply inlet communicating with said bore inwardly of said restricted bore, an air inlet pipe communicating with said nozzle tube, a second plug in said tube at the opposite end thereof having an air escape outlet therein, a member connected to said slidable tube and carrying means for closing said air outlet, means cooperating with said slidable tube for maintaining the same in choking engagement with said restricted bore and for maintaining the outlet closing means away from said outlet, and means associated with said slidable tube and said member for moving the same in a direction to close said air outlet and move said slidable tube away from said restricted bore.

3. A sprayer including in combination, a nozzle tube, an air inlet tube communicating therewith, a discharge plug in an end of said nozzle tube having a bore therethrough of varying cross sectional area and including a portion of restricted size between its ends, a liquid supply inlet communicating with said bore rearwardly of the said restricted portion, an air tube slidable in said bore and having an end for entering said restricted portion of said bore, a spring normally effective to move said slidable tube into said restricted bore to choke the same, a trigger for moving said slidable tube in the opposite direction, and a slide valve for controlling air passage from the nozzle tube to the air tube.

4. A sprayer including in combination, a tube, a bored plug in one end of said tube, the bore of said plug comprising a cylindrical portion, a converging portion and a diverging portion in the order named in the direction of flow, a tube slidable in the cylindrical portion of said bore and having a converging end for choking said converging portion of said bore, means for normally urging said slidable tube forwardly in said plug bore, an air supply pipe communicating with said first mentioned tube, said slidable tube having an air admission port therein outwardly of said plug, a liquid supply inlet communicating with said cylindrical bore, a liquid container supported on said first mentioned tube and in communication with said tube, said first mentioned tube having an air escape opening therein, means passing through said opening and connected to said slidable tube, said means carrying a valve for closing said opening when said means are actuated to move said slidable tube rearwardly in said converging bore and thereby opening communication between said liquid inlet and said plug bore.

5. A spraying device including in combination a nozzle tube, a bored plug in one end of said tube, an apertured closure in the other end of said tube, the bore of said plug having a restricted portion intermediate its ends, a tube slidable in said bore for choking said restricted portion, a screw passing through said apertured closure and connected to said slidable tube, a valve on said screw for closing the aperture in said closure, means within said nozzle tube for urging said slidable tube towards said restricted portion of said plug bore and moving said valve away from said aperture in said closure, a trigger pivoted on said nozzle tube and connected to said screw for moving said screw and said slidable tube in the opposite direction, and an air supply pipe communicating with said nozzle tube, and a liquid supply inlet communicating with said plug bore rearwardly of the restricted portion of the same.

6. A spraying device including in combination a nozzle tube, a bored plug in one end of said tube, an apertured closure in the other end of said tube, the bore of said plug having a restricted portion intermediate its ends, a tube slidable in said bore for choking said restricted portion, a screw passing through said apertured closure and connected to said slidable tube, a valve on said screw for closing the aperture in said closure, means within said nozzle tube for urging said slidable tube towards said restricted portion of said plug bore and moving said valve away from said aperture in said closure, a trigger pivoted on said nozzle tube and connected to said screw for moving said screw and said slidable tube in the opposite direction, and an air supply pipe communicating with said nozzle tube, and a liquid supply inlet communicating with said plug bore rearwardly of the restricted portion of the same, a stirrup connecting said trigger and said screw, and means on said screw for adjusting said screw with respect to said stirrup.

7. A spraying device including in combination, a nozzle tube, a liquid container removably supported near one end of said tube, a handle secured at the other end of said tube, a bored plug member in the end of said tube adjacent said container, the bore of said plug including a cylindrical portion, a converging portion and a diverging portion in the direction of flow, an apertured plug closing the other end of said nozzle tube, a screw member passing through the aperture in said last mentioned plug, a tube slidably arranged in the cylindrical bore of said first mentioned plug and having a converging end for entering the converging bore of said plug, connections between said screw and said slidable tube for varying the distance between the same, said connections having an air inlet port communicating with the interior of said slidable tube, a valve on said screw for closing the aperture through said second mentioned plug, a guide member on said connecting means for preventing rotation thereof when said screw is rotated, a spring between said guiding means and the second mentioned plug for normally urging said slidable tube into choking engagement with the restricted or converging bore of said first mentioned plug and moving said valve away from the aperture in said second mentioned plug, a trigger pivoted to said nozzle tube outwardly of the same, a stirrup connected to said trigger and associated with said screw outwardly of the rear end of said nozzle tube, a nut on said screw for adjusting the position of said screw with respect to said stirrup, and the connections between said nozzle tube and said liquid container providing an air passage therebetween, and a pipe extending from the liquid inlet in said first mentioned plug into said liquid container and terminating near the bottom of the same.

8. A sprayer including in combination, a nozzle tube, an air inlet communicating therewith, said tube having an end with a bore therethrough of varying cross-sectional area and including a restricted portion, a pipe arranged for axial movement in said bore and extending into said restricted portion to stop the same under certain conditions, a piston at the opposite end of said pipe, a block having a bore receiving said piston and provided with a plug beyond said piston constituting a cylinder, said cylinder having apertures therein so disposed as to lie between said piston and said plug when said pipe is in engagement with the restricted portion of said nozzle bore to prevent air admission to said pipe, and means for moving said cylinder to withdraw said pipe from closing engagement with said nozzle bore and place the same in communication with the interior of said nozzle tube for admission of air to said pipe.

9. A sprayer including in combination a nozzle tube, an air inlet communicating with said tube, said tube having a restricted discharge end portion with a bore therethrough of varying cross-sectional area, said bore including a restricted portion, a liquid supply communicating with said bore inwardly of said restricted portion, a pipe axially movable in said bore and arranged to have an end thereof engage the restricted portion for stopping the same against liquid discharge under certain conditions, a piston on the other end of said pipe, a movable cylinder receiving said piston, said cylinder having apertures communicating with the interior of said nozzle tube, the parts being so arranged that when said pipe is in stopped position in said restricted bore said apertures in said cylinder prevent admission of air to said pipe, said tube having an air escape opening, and means for moving said cylinder to place said pipe in communication with the interior of said nozzle tube and to retract said pipe from stopping engagement with said restricted bore, and means associated with said last mentioned means for closing the atmosphere port.

10. A sprayer including a nozzle tube having a discharge end portion with bores of varying cross-sectional areas therethrough, a pipe extending into said bore and arranged to close the same under certain conditions, a movable cylinder within said tube and surrounding the opposite end of said pipe, said cylinder having ports therein communicating with the interior of said nozzle tube, said nozzle tube having an aperture therein remote from said discharge end, means for moving said cylinder to place said ports in such position as to allow communication between said pipe and the interior of said nozzle tube, said means including a rod fastened to said cylinder and extending through said aperture in the nozzle tube, said rod carrying a valve for closing said aperture when said parts are moved to open communication through the discharge bore of said tube.

11. A sprayer including a nozzle tube, said tube having a discharge end with a restricted orifice, a combined sliding needle valve and air tube movable against and away from said restricted orifice, a slide valve about said last mentioned tube for controlling air admission thereto, means cooperating with said needle valve tube for normally urging it against said restricted orifice, means for moving said needle valve tube with respect to said valve as to shut off air admission through said valve to the needle valve tube, and means for sliding valve in a direction to open air admission to said needle valve tube and for moving said tube from against said restricted orifice.

In testimony whereof I have hereunto subscribed my name at Chicago, Cook County, Illinois.

ADAM A. BREUER.